United States Patent
Arai et al.

(10) Patent No.: US 6,865,070 B2
(45) Date of Patent: Mar. 8, 2005

(54) SOLID ELECTROLYTIC CAPACITOR

(75) Inventors: Satoshi Arai, Sendai (JP); Takayuki Inoi, Sendai (JP); Yoshihiko Saiki, Sendai (JP); Sadamu Toita, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/639,203

(22) Filed: Aug. 11, 2003

(65) Prior Publication Data

US 2004/0042157 A1 Mar. 4, 2004

(30) Foreign Application Priority Data

Aug. 28, 2002 (JP) ........................................ 2002-248011

(51) Int. Cl.[7] .................................................. H01G 9/00
(52) U.S. Cl. ........................................ 361/523; 361/525
(58) Field of Search ............................... 361/523, 524, 361/528, 531, 532, 533; 29/25.03

(56) References Cited

U.S. PATENT DOCUMENTS

| | | | | |
|---|---|---|---|---|
| 5,005,107 A | * | 4/1991 | Kobashi et al. | 361/540 |
| 5,424,907 A | * | 6/1995 | Kojima et al. | 361/532 |
| 6,324,051 B1 | * | 11/2001 | Igaki et al. | 361/523 |
| 6,462,936 B1 | * | 10/2002 | Fujimoto et al. | 361/525 |
| 6,552,896 B1 | * | 4/2003 | Igaki et al. | 361/523 |

FOREIGN PATENT DOCUMENTS

JP     5-275290 A     10/1993

* cited by examiner

*Primary Examiner*—Anthony Dinkins
(74) *Attorney, Agent, or Firm*—Frishauf, Holtz, Goodman & Chick, P.C.

(57) ABSTRACT

The invention provides a solid electrolytic capacitor of a configuration having a metal plated layer in a cathode part in order to prevent a decrease in the conductivity by oxidation of a conductive polymer and to realize a high reliability. Also there is provided a configuration in which a cathode part of the solid electrolytic capacitor includes a first metal plated layer and a solderable second metal layer.

10 Claims, 3 Drawing Sheets

SOLID ELECTROLYTIC CAPACITOR

The present application claims priority to prior Japanese application JP 2002-248011, the disclosure of which is incorporated herein by reference.

BACKGROUND OF THE INVENTION

The present invention relates to a solid electrolytic capacitor, and more particularly to a solid electrolytic capacitor utilizing a conductive polymer as a solid electrolyte.

A solid electrolytic capacitor has a configuration constituted by forming an anode with a valve-action metal such as tantalum, niobium or aluminum, oxidizing a surface of the anode to form a dielectric member, forming thereon a closely contacting layer of manganese dioxide or a conductive polymer, and forming on that layer a graphite layer or a silver paste layer as a cathode.

The manganese dioxide or the conductive polymer constitutes a solid electrolyte, and particularly the conductive polymer is being employed frequently in recent years, as it has a high conductivity and can reduce an equivalent series resistance (ESR) of a capacitor.

The solid electrolytic capacitor utilizing a conductive polymer as a solid electrolyte is disclosed for example in Japanese Patent Application Laid-open No. 5-275290 (which will be hereinafter referred to as related art 1).

In a solid electrolytic capacitor based on the related art 1, an aluminum foil subjected to a surface enlargement by etching, which will be referred to as an etched aluminum foil, is divided by an epoxy resin member, into a first area for connecting an external anode terminal, starting from an end in the longitudinal direction, and a second area for realizing a capacity. In the first area which constitutes a major portion of a side of the aluminum foil, an aluminum oxide film is formed which is obtained by anodizing the aluminum foil. A polypyrrole layer is formed by a conductive polymer and is provided on such aluminum oxide film. On the polypyrrole layer, a graphite layer and a silver paste layer are formed in succession and in closely contacted manner. A basic structure of a capacitor, which will be referred to as a solid electrolytic capacitor element, is formed by the aluminum foil, the aluminum oxide film, the polypyrrole layer, the graphite layer and the silver paste. The anode is constituted by the aluminum foil, the dielectric member is constituted by the aluminum oxide film, and the cathode is constituted by the polypyrrole layer, the graphite layer and the silver paste. For electrical connection with the exterior, an external anode terminal and an external cathode terminal are mounted on the capacitor element, and an external package is provided for sealing the element and shaping the external form of the capacitor.

The external anode terminal and the external cathode terminal are formed by a base member formed by a copper-based or iron-based metal and surfacially plated with a metal for enabling soldering. The external anode terminal is adjoined by an electric welding or an ultrasonic welding to the aluminum foil constituting the anode, while the external cathode terminal is electrically fixed, for example by a conductive adhesive material, to an outermost layer of the cathode.

The conductive polymer employed in the prior solid electrolytic capacitor is associated with a drawback, though initially having a high conductivity, of losing the conductivity by being oxidized in an oxygen-containing atmosphere of a high temperature. Therefore, in case the interception of oxygen is insufficient in the cathode, ESR will be deteriorated when the solid electrolytic capacitor is exposed to a high temperature over a long period. In the related solid electrolytic capacitor, the cathode is constituted by forming a graphite layer and a silver paste layer on a conductive polymer layer. The graphite layer and the silver paste layer cannot be formed densely and is therefore unable to sufficiently prevent intrusion of oxygen.

Also in the prior solid electrolytic capacitor, the external cathode terminal has a solder plating or a tin plating on the surface of a base metal, in order to enable soldering thereby facilitating the mounting. Such plating certainly facilitates soldering, but is associated with a drawback of being partially fused in a surface adhered to the cathode of the capacitor element, thereby causing a peeling of the external cathode terminal and the conductive adhesive and increasing a contact resistance with the cathode electrode.

SUMMARY OF THE INVENTION

In consideration of the foregoing, it is an object of the present invention to form a dense film by metal plating in order that a conductive polymer, employed in the cathode of the solid electrolytic capacitor element, is not oxidized, thereby improving the reliability of the capacitor.

It is another object of the present invention to form a plating of a metal such as gold or silver which is higher in the melting temperature and chemically more stable than solder, on a surface of an external cathode terminal connected with the cathode of the solid electrolytic capacitor, thereby suppressing a change in an interfacial resistance at the mount of the cathode of the capacitor with the external cathode terminal, and thus improving the reliability of the capacitor.

According to the present invention, there is provided a solid electrolytic capacitor which includes an anode part having a lead wire extracted from at least an end of a metal piece having an oxide film in a part thereof, a solid electrolyte having a conductive polymer layer formed on the oxide film, and a cathode part having a conductive material layer formed on said conductive polymer layer.

In the solid electrolytic capacitor, the cathode part further includes a first metal plated layer.

In the solid electrolytic capacitor of the invention, the cathode part is preferably provided with the aforementioned first metal plated layer and a solderable second metal layer.

DESCRIPTION OF THE PREFERRED EMBODIMENTS

Figure 1:
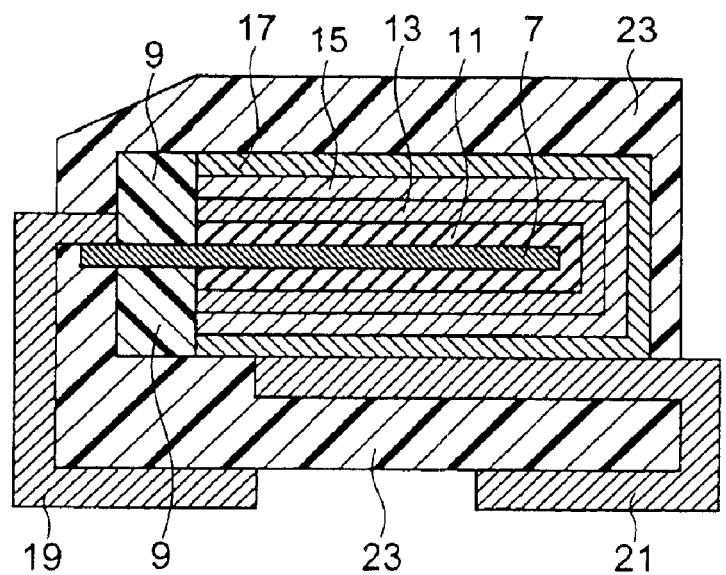
FIG. 1 is a longitudinal cross-sectional view of an aluminum solid electrolytic capacitor of a related art.

For facilitating the understanding of the present invention, explanation will at first be made of a solid electrolytic capacitor of a related art, with reference to FIG. 1. In the following description, for the convenience of explanation, components of the capacitor may be represented by names or symbols which are different from those in the aforementioned patent references.

Referring to FIG. 1, an aluminum foil 7, subjected to a surface enlargement by etching, which foil will be referred to as an etched aluminum foil, is divided by an epoxy resin member 9, from the left-hand side of the drawing, into an area for connecting an external anode terminal, and a second area for developing a capacity. In the capacity developing area, constituting a major portion of the aluminum foil 7 at the right-hand side of the drawing, there is formed an aluminum oxide film 11 obtained by anodizing the aluminum foil 7 constituting a base member.

On and in intimate contact with the aluminum oxide film 11, there is formed a layer 13 of polypyrrole which is a conductive polymer. On the polypyrrole layer 13, a graphite layer 15 and a silver paste layer 17 are formed in succession in this order and in intimate contact. A basic structure of a capacitor, which will hereinafter be referred to as a solid electrolytic capacitor element, is constituted by the aluminum foil 7, the aluminum oxide film 11, the polypyrrole layer 13, the graphite layer 15 and the silver paste layer 17. Thus the aluminum foil 7 serves as an anode electrode, the aluminum oxide film 11 constitutes a dielectric member, and the polypyrrole layer 13, the graphite layer 15 and the silver paste layer 17 constitute a cathode electrodes.

On such capacitor element, an external anode terminal 19 and an external cathode terminal 21 are mounted for electrical connection with the exterior, and an external package 23 is provided in order to seal the element and to shape an external form of the capacitor.

The external anode terminal 19 and the external cathode terminal 21 are formed by a base member formed by a copper-based or iron-based metal and surfacially plated with a solderable metal. The external anode terminal 19 is adjoined by an electric welding or an ultrasonic welding to the aluminum foil 7 constituting the anode electrode, while the external cathode terminal 21 is electrically fixed, for example by a conductive adhesive material (not illustrated), to an outermost layer of the cathode electrode.

Now, description will be made as regards the preferred embodiments of the present invention, with reference to FIGS. 2 to 6.

Figure 2:
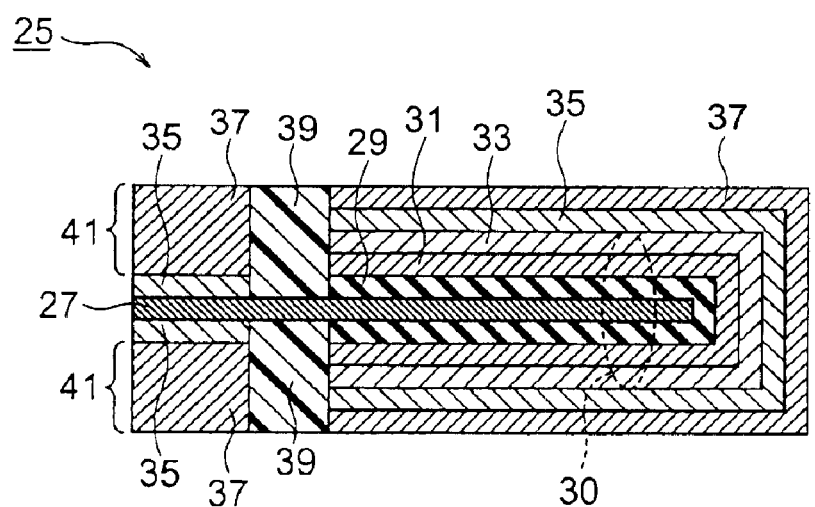
FIG. 2 is a longitudinal cross-sectional view of an aluminum solid electrolytic capacitor of a first embodiment of the present invention.

Referring to FIG. 2, in an aluminum solid electrolytic capacitor 25 according to a first embodiment of the invention, an aluminum foil 27 is provided for serving as an anode and is subjected to a surface enlargement by an etching. For example an aqueous solution of hydrochloric acid is employed as an etching solution. Then, in the aluminum foil 27, a first area serves as a capacity developing area occupying a major portion at the right-hand side in FIG. 2, and is anodized to form a film 29 of aluminum oxide ($Al_2O_3$). For anodizing, use is made of, for example, an aqueous solution of an ammonium salt of adipic acid, citric acid or phosphoric acid.

Then, on the anodized aluminum oxide film 29, a conductive polymer layer 31 of polypyrrole is formed as a solid electrolyte, and then a graphite layer 33 is formed thereon.

An anode-constituting part of the aluminum foil 27 is provided at one end of solid electrolytic capacitor element 30. The graphite layer 33 and the anode-constituting part of the aluminum foil 27, except for an insulating resin 39 formed on the aluminum foil 27 in advance, are subjected to a plating process to form a plated layer 35, and then to a formation of a solder layer 37.

According to the invention, since a dense metal plated layer is formed on the external periphery of the element, the intrusion of oxygen from the exterior can be securely prevented in comparison with a prior element.

Next, description will be made as regards a reliability test for the solid electrolytic capacitor of the first embodiment of the invention.

This test is a high-temperature standing test, in which a sample is let to stand in an environment of a temperature of 125° C. and electric characteristics of the sample is measured with the lapse of time. For evaluating the electrical characteristics, use was made of an equivalent serial resistance (ESR) at a frequency of 100 kHz.

Figure 3:
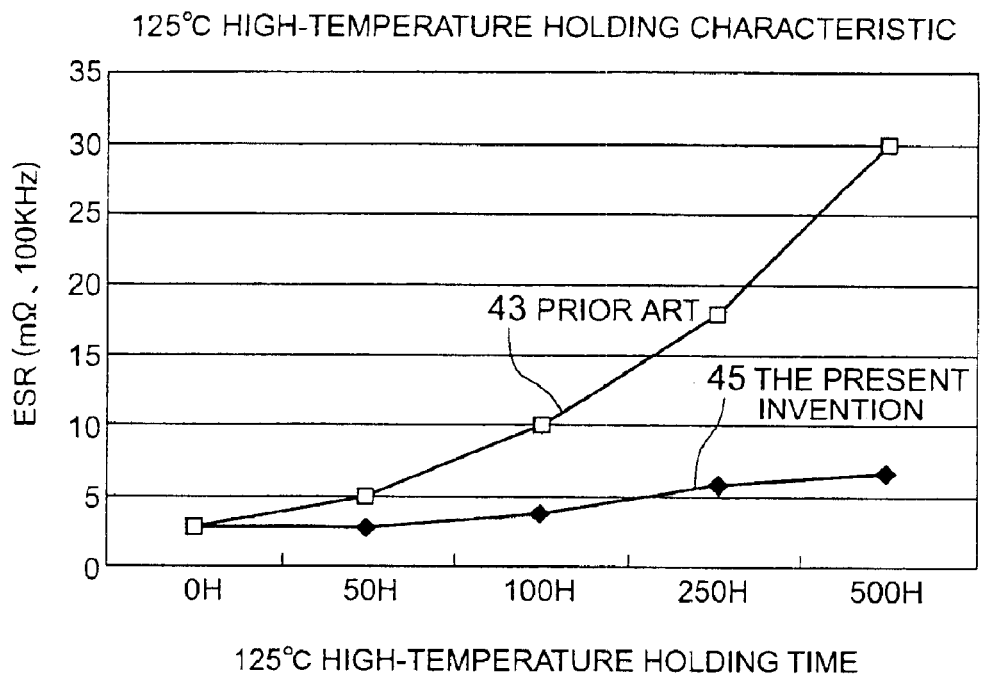
FIG. 3 is a chart showing a comparison of a solid electrolytic capacitor of a related art and a solid electrolytic capacitor of the first embodiment, in a time-dependent change in ESR in a high-temperature standing test.

Referring to FIG. 3, both a sample of the first embodiment, represented by a curve 45, and a sample of the prior technology represented by a curve 43 showed approximately same initial values of about 3 mΩ prior to the start of the test. After the start of the test, the capacitor of the prior technology and the capacitor of the present embodiment provided approximately same curves for about initial 50 hours. Thereafter, the ESR of the capacitor of the prior technology, represented by the curve 43, started to show an increasing tendency, thus being separated from the curve of the capacitor of the present embodiment, represented by the curve 45.

After the lapse of 500 hours, the capacitor of the present embodiment, represented by the curve 45, showed an ESR of about 6 mΩ which was about twice of the initial value, while the prior capacitor represented by the curve 43 showed an increase in ESR to about 30 mΩ which was as high as about 10 times of the initial value.

As shown in the aforementioned test result, the high sealing power of the capacitor of the present embodiment brings about a significant effect in improving the time-dependent deterioration of ESR and the stability of characteristics and in achieving a high reliability and a longer service life, particularly when a conductive polymer having a tendency to lower the conductivity at presence of oxygen is used as a solid electrolyte.

In the present embodiment, for the plated metal, use can be made of, for example copper, nickel, silver or gold. Also for plating, use can be made of an electrolytic plating method or a non-electrolytic plating method. The solder layer can be formed either by a solder plating method, a tin plating method etc., or by a method of immersion in a fused solder tank.

The present first embodiment employs polypyrrole, obtained by a chemical oxidation polymerization of a pyrrole monomer, as the conductive polymer, but there can also be employed other materials such as polythiophene or polyaniline. Also the method of forming a polymer is not limited to a chemical oxidation polymerization but an electrolytic oxidation polymerization may be employed for this purpose.

Figure 4:
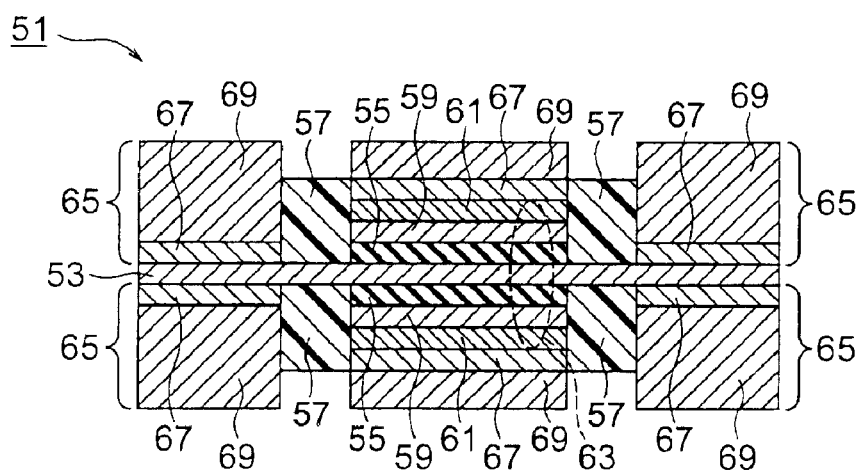
FIG. 4 is a longitudinal cross-sectional view of an aluminum solid electrolytic capacitor of a second embodiment of the present invention.

Next, explanation will be made as regards an aluminum solid electrolytic capacitor according to a second embodiment of the present invention with reference to FIG. 4. Refering to FIG. 4, a solid electrolytic capacitor 51 according to the second embodiment of the invention includes a solid electrolytic capacitor element 63 which is obtained by forming, in a predetermined portion of an etched aluminum foil (as a valve action metal) 53 formed by an etching in an etching aqueous solution for example of hydrochloric acid, an aluminum oxide film 55 in an aqueous processing solution of an ammonium of adipic acid, citric acid, phosphoric acid etc., then coating and hardening an insulating resin 57 thereby forming a masking, and forming a conductive polymer layer 59 and a graphite layer 61 in succession on a predetermined portion of the aluminum oxide film 55.

Then a metal plating is applied on the graphite layer 61 and on anode parts 65 provided on both ends of the solid electrolytic capacitor element 63, thereby forming a plated layer 67 except for the portion of the insulating resin 57 formed in advance. Then a solid electrolytic capacitor is completed by forming a solder layer 69 on the plated layer 67 of the element 63 and the anode part 65.

The aluminum solid electrolytic capacitor 51 of the second embodiment of the invention is a solid electrolytic capacitor of so-called three-terminal structure, and can prevent intrusion of oxygen, moisture etc. from the exterior by forming a dense metal layer on the external periphery of the element similarly to the first embodiment.

The present invention is not limited to the aforementioned embodiments but is subject to modifications within the scope of the invention, and, in addition to the aforementioned configurations, there can be conceived following configurations:

(1) an etched aluminum foil+a conductive polymer layer+a graphite layer+a metal plated layer;

(2) an etched aluminum foil+a conductive polymer layer+a graphite layer+a metal plated layer+a silver paste layer;

(3) an etched aluminum foil+a conductive polymer layer+a metal plated layer+a solder layer; and (4) an etched aluminum foil+a conductive polymer layer+a graphite layer+a metal plated layer+a solder layer.

The present invention is applicable also to a solid electrolytic capacitor utilizing another valve action metal such as tantalum or niobium as the anode.

Figure 5:
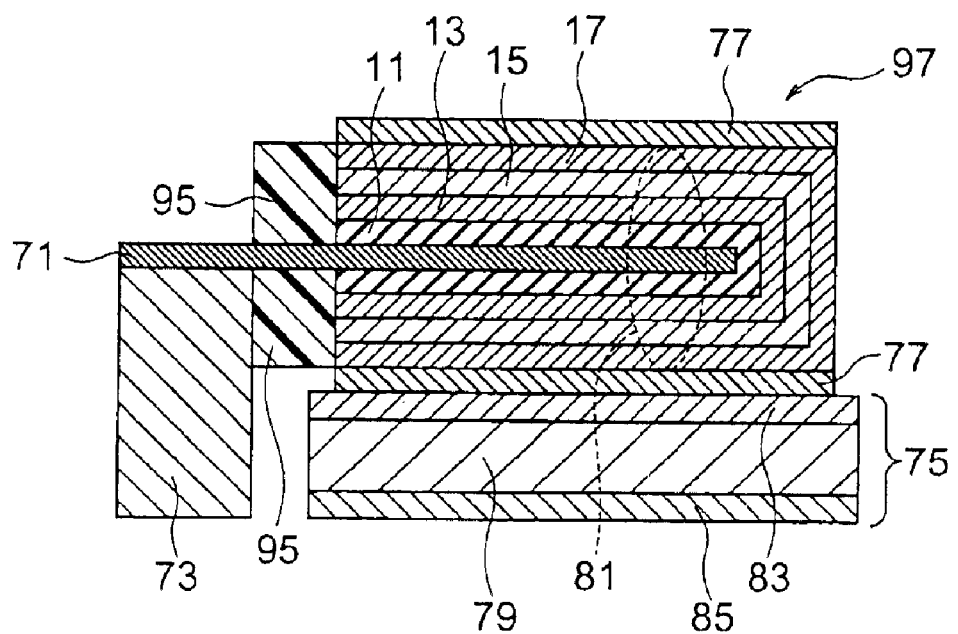
FIG. 5 is a longitudinal cross-sectional view of an aluminum solid electrolytic capacitor of a third embodiment of the present invention.
Figure 6:
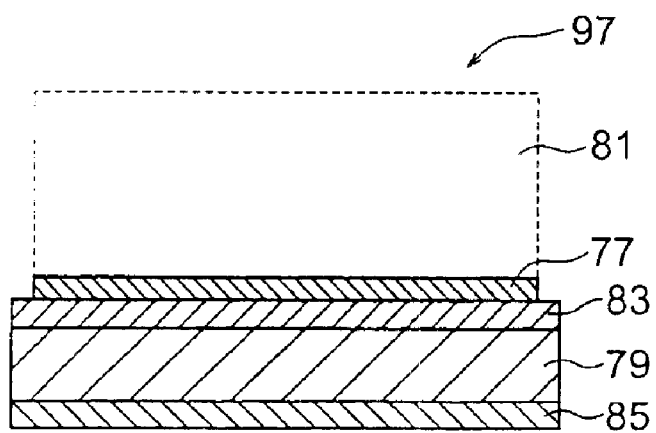
FIG. 6 is a transversal cross-sectional view of the aluminum solid electrolytic capacitor of the third embodiment of the present invention.

Next, descriptions will be made as regards an aluminum solid electrolytic capacitor according to a third embodiment of the invention with reference to FIGS. 5 and 6. Referring to FIGS. 5 and 6, a solid electrolytic capacitor 97 according to the third embodiment of the invention employs a cathode part of the solid electrolytic element 81 of a structure same as that in the prior art. Then, an external anode terminal 73 is mounted in a portion of an aluminum foil 71, made available for mounting the external anode terminal. The external anode terminal 73 is formed by a solderable material, such as a 42 alloy or a copper plate, on which a solder plating is applied. It is adjoined to the aluminum foil 71 for example by an ultrasonic welding or an electric resistance welding.

Then an external cathode terminal 75 is adhered to the cathode part with a conductive adhesive 77 such as a silver paste. The external cathode terminal 75 has a cathode terminal metal 79, such as a 42 alloy, copper or iron, which has a cathode-connecting surface plated layer 83 such as a gold plated layer or a silver plated layer on a surface to be adjoined to the element 81, and a mounting surface plated layer 85 that can be soldered, such as a solder plating or a tin plating, on the other surface.

In the present invention, an adjoining through a silver plated layer or a gold plated layer, which is chemically similar to the silver paste constituting the conductive adhesive, achieves chemical stability, and such plating, having a higher melting temperature than in the solder, is not fused at the mounting operation there by maintaining the adjoining interface in a stable state.

In an application of the present invention, the first or second embodiment may be used in combination with the third embodiment.

According to the present invention, as explained in the foregoing, a metal plated layer is provided in the cathode part of the solid electrolytic capacitor thereby preventing intrusion of oxygen and suppressing the deterioration of the characteristics of the conductive polymer. Also a gold plated layer or a silver plated layer is provided in the surface of the external cathode terminal, for adjoining with the capacitor element, thereby avoiding a change in the equivalent serial resistance in the mounted state.

What is claimed is:

1. A solid electrolytic capacitor comprising:
   an anode part including a lead wire which comprises at least one end of a metal piece and which has an oxide film formed on a part thereof;
   a solid electrolyte comprising a conductive polymer layer formed on said oxide film;
   a cathode part comprising:
      a conductive material layer formed on said conductive polymer layer;
      a first metal plated layer; and
      a solderable second metal layer on said first metal plated layer.

2. A solid electrolytic capacitor according to claim 1, wherein said first metal plated layer comprises at least one of a copper plated layer, a nickel plated layer, a gold plated layer, and a silver plated layer.

3. A solid electrolytic capacitor according to claim 1, wherein said second metal layer comprises at least one of a solder layer, a tin layer and a solderable silver paste layer.

4. A surface mounting solid electrolytic capacitor comprising:
   an anode part including a lead wire which comprises at least one end of a metal piece and which has an oxide film formed on a part thereof;
   a solid electrolyte comprising a conductive polymer layer formed on said oxide film;
   a cathode part comprising:
      a conductive material layer formed on said conductive polymer layer;
      a first metal elated layer; and
   a cathode terminal connected to said cathode part, said cathode terminal comprising:
      a solderable third metal plated layer on a mounting surface of said cathode terminal; and
   a fourth metal plated layer on a surface of said cathode terminal to be adjoined to said cathode part,
   wherein said fourth metal plated layer has a higher melting temperature than said third metal plated layer and is chemically stable.

5. A solid electrolytic capacitor according to claim 4, wherein said third metal plated layer comprises at least one of a solder plated layer and a tin plated layer.

6. A solid electrolytic capacitor according to claim 4, wherein said fourth metal plated layer comprises at least one of a gold plated layer and a silver plated layer.

7. A solid electrolytic capacitor according to claim 1, wherein said conductive material layer comprises a graphite layer, and a silver paste is formed on said graphite layer.

8. A solid electrolytic capacitor according to claim 1, wherein said metal piece comprises aluminum, and said oxide film comprises aluminum oxide.

9. A solid electrolytic capacitor according to claim 1, further comprising an insulating resin which is provided around a boundary between a central part and the anode part of said metal piece, and which divides said metal piece into a first area for developing a capacitance and a second area which is adapted to be connected to an external anode terminal.

10. A solid electrolyte capacitor according to claim 1, wherein said at least one end of the metal piece comprises both ends of said metal piece.

* * * * *

UNITED STATES PATENT AND TRADEMARK OFFICE
CERTIFICATE OF CORRECTION

| | |
|---|---|
| PATENT NO. | : 6,865,070 B2 |
| APPLICATION NO. | : 10/639203 |
| DATED | : March 8, 2005 |
| INVENTOR(S) | : Satoshi Arai et al. |

It is certified that error appears in the above-identified patent and that said Letters Patent is hereby corrected as shown below:

Column 6, line 34 (claim 4, line 11):

change "metal elated layer" to --metal plated layer--.

Signed and Sealed this

Twenty-ninth Day of July, 2008

JON W. DUDAS
*Director of the United States Patent and Trademark Office*